United States Patent [19]

Barr

[11] 4,225,066
[45] Sep. 30, 1980

[54] DEVICE FOR SECURING SPARE WHEELS

[76] Inventor: Rolla W. Barr, 16300 Fontaine Dr., Chesterfield, Mo. 63017

[21] Appl. No.: 5,310

[22] Filed: Jan. 22, 1979

[51] Int. Cl.² ............................................. B62D 43/08
[52] U.S. Cl. ................................. 224/42.24; 70/259; 224/42.25
[58] Field of Search ............... 224/42.24, 42.25, 42.13, 224/42.12, 42.06, 42.45 R, 42.46 R, 273; 70/258, 259, 260, 18

[56] References Cited

U.S. PATENT DOCUMENTS

| 1,429,105 | 9/1922 | Rudy | 70/56 |
|---|---|---|---|
| 1,519,751 | 12/1924 | Baker | 224/42.24 |
| 1,759,212 | 5/1930 | Wasserfallen | 224/42.24 |
| 2,674,394 | 4/1954 | Hall et al. | 224/42.24 |
| 3,302,836 | 2/1967 | Herndon | 224/42.24 |
| 3,613,972 | 10/1971 | Daughhetee | 224/42.24 |
| 3,990,618 | 11/1976 | Shattuck | 224/42.24 |
| 4,076,158 | 2/1978 | Barr | 224/42.24 X |
| 4,089,449 | 5/1978 | Bayne | 224/42.24 |
| 4,111,344 | 9/1978 | MacDonald | 224/42.24 |
| 4,122,693 | 10/1978 | Barr | 70/56 |

Primary Examiner—Robert J. Spar
Assistant Examiner—Jerold M. Forsberg
Attorney, Agent, or Firm—James R. Bell

[57] ABSTRACT

An apparatus for securing a spare wheel is provided for use in the bed portion of a pick-up truck. A baseplate is secured to one of the vertical sidewalls of the truck bed. A first member has a first end removably secured to the baseplate and extends therefrom. A second member is fixedly secured to the first member and extends substantially parallel with the first member. The first member is of sufficient construction to extend through a hub hole of an associated spare wheel. The second member is of sufficient construction to extend through a lug hole of the spare. The spare is retained on the second end of the first member.

4 Claims, 6 Drawing Figures

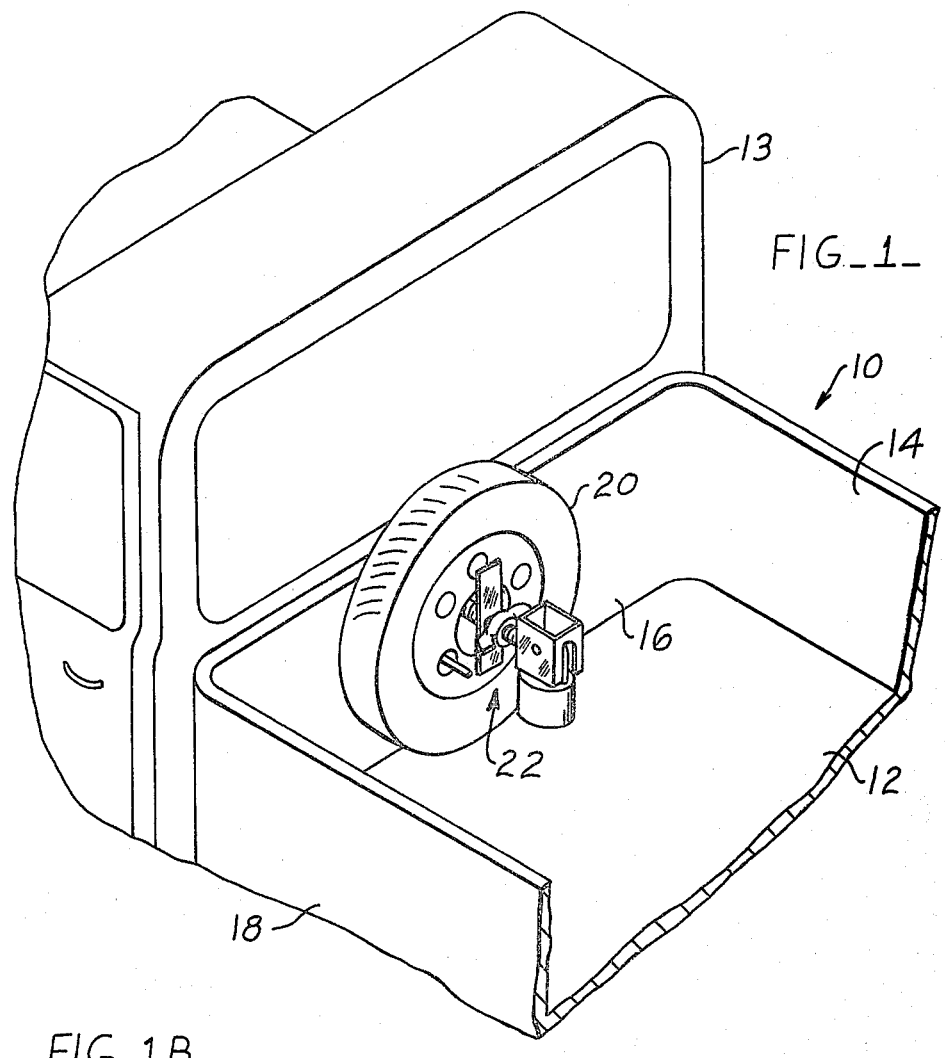
FIG_1_
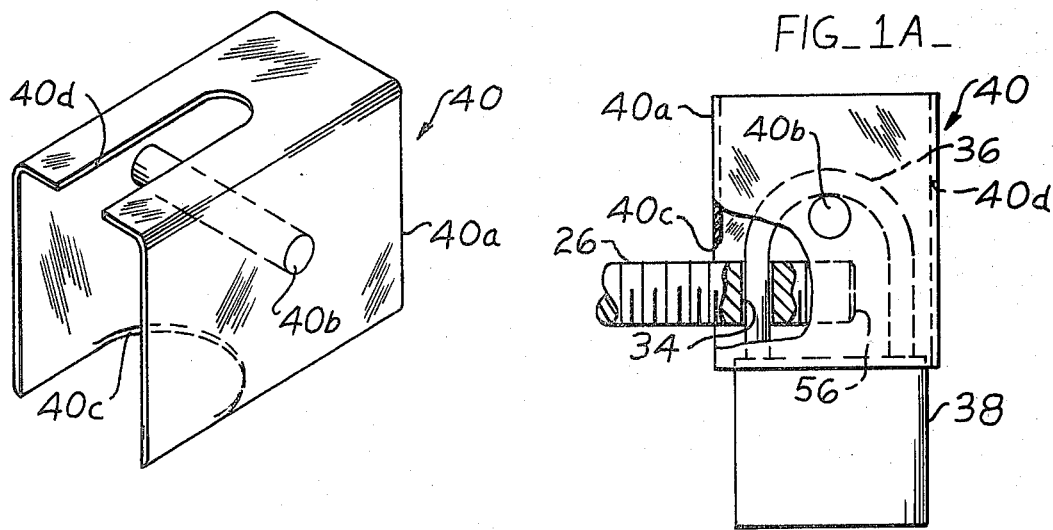
FIG_1B_
FIG_1A_

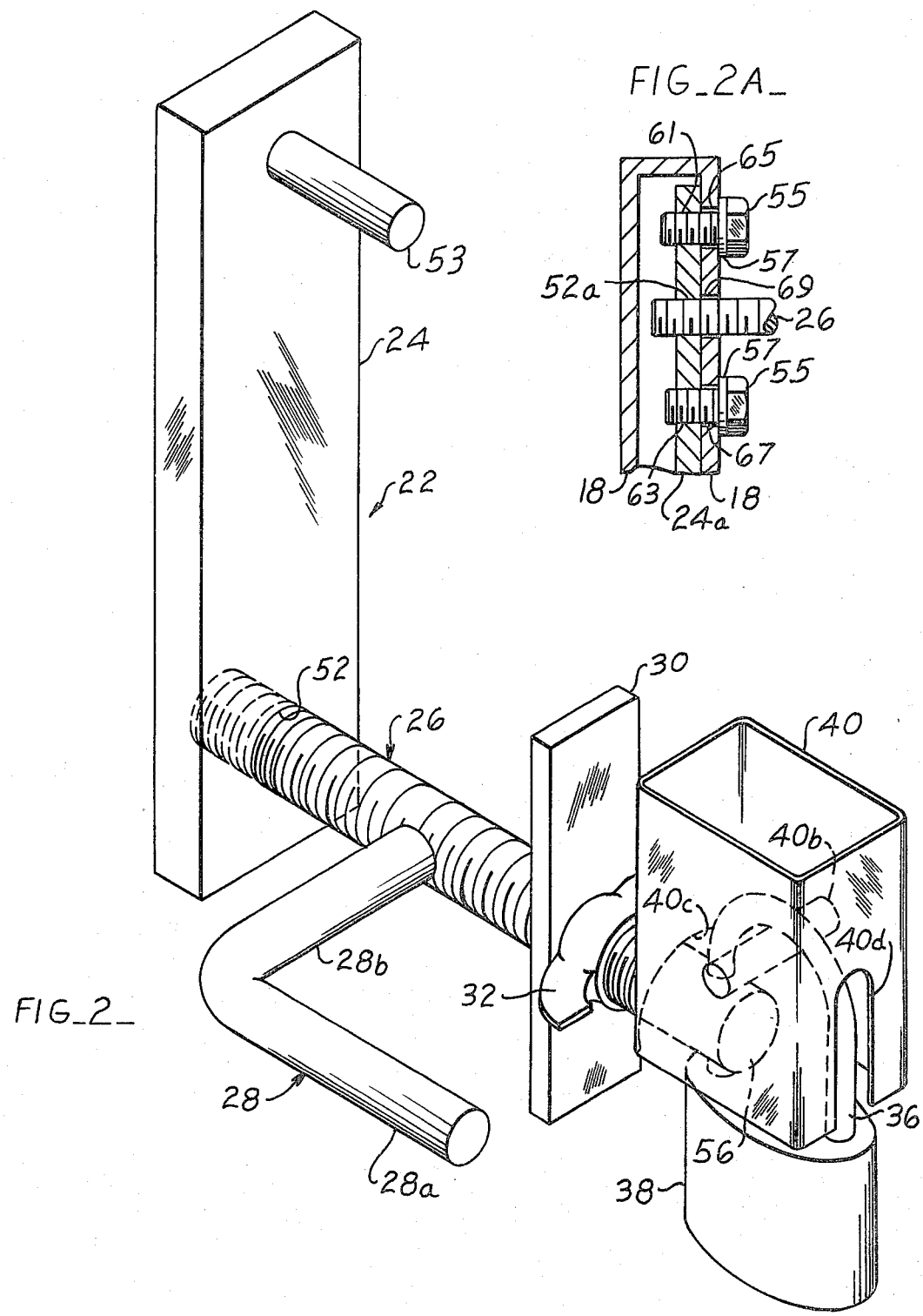

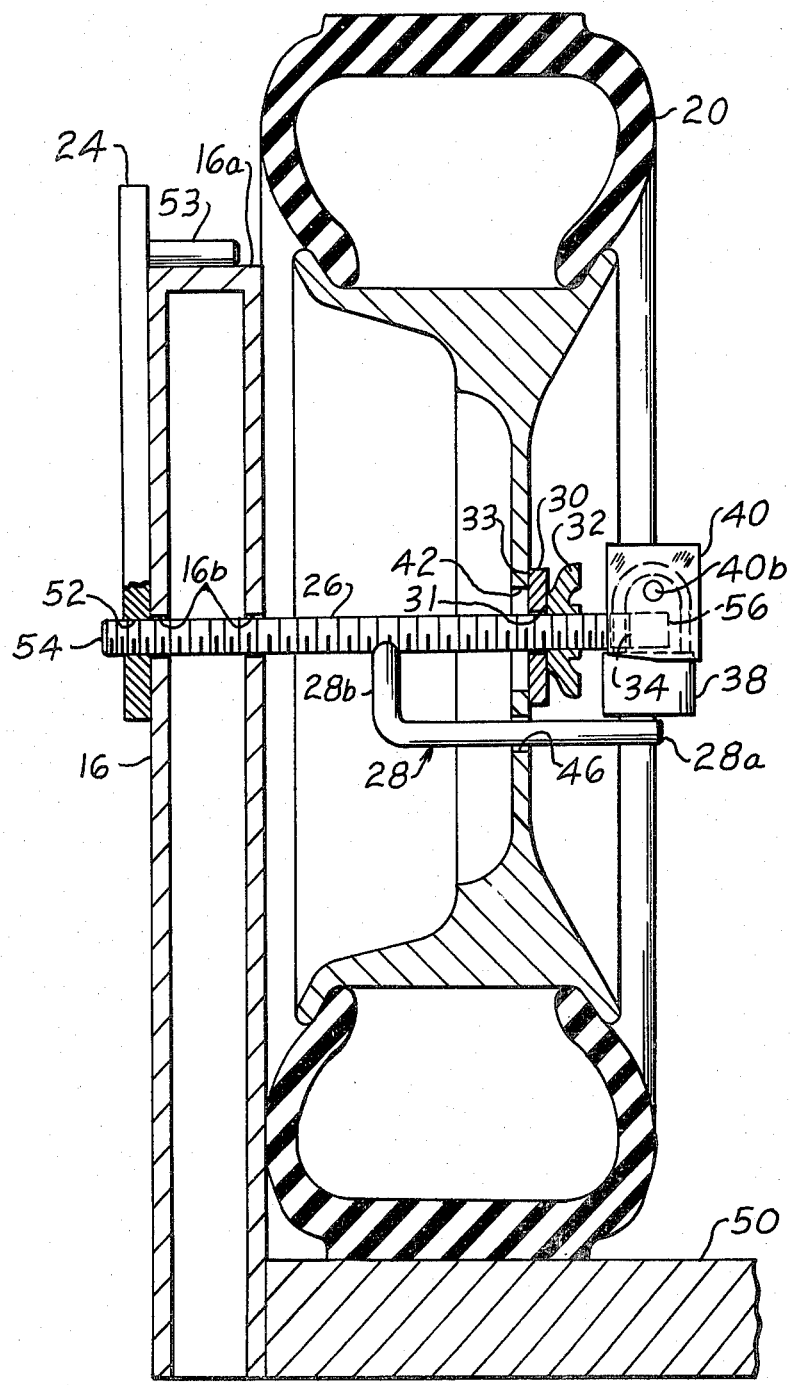
FIG_3_

DEVICE FOR SECURING SPARE WHEELS

BACKGROUND OF THE INVENTION

1. Field of the Invention

This invention relates generally to locks and more specifically to accessories for automotive vehicles such as spare wheels.

2. Description of the Prior Art

A spare wheel mounted on a pick-up truck is generally exposed; that is, it is not secured within a covered area such as a trunk as in the case of spares used in passenger type automotive vehicles. As a result, such exposed spares are subject to three undesirable conditions. First, such spares are generally mounted underneath the bed portion of the truck and as such are in proximity with the road. The spare is usually held in place by a nut engaging a threaded support member. Since the spare is exposed and in proximity with the road, the result is that the spare and its associated mounting device are subjected to dirt, road grit, corrosive elements, natural elements and the like. Use of a spare is generally not required for a substantial period of time, for example, a year or more. Thus, after the truck has been driven for some time and the use of the spare becomes necessary, the threaded member and the nut are commonly found to be in mechanically frozen contact thus rendering their separation difficult or impossible. If such is the case, it may become necessary to damage or destroy the nut and its associated support member so that the spare can be removed.

Second, such spares, especially when new and easier to remove, are subject to theft since they are not secured in a covered area such as a vehicle trunk.

Third, as stated above, presently known spare wheel and tire arrangements used on pick-up trucks are mounted underneath the bed portion of the truck suspended by a support member. This arrangement is very inconvenient. Removal and replacement of the spare is a dangerous, difficult and physically tiresome task. Even if the nut and threaded member are not found to be in mechanically frozen contact, once the nut is removed and the spare is free of the support or tire mounting device, the gravity prone spare drops or falls from its support toward the ground. This presents a dangerous and undesirable situation. Similarly, when the heavy spare is to be replaced, it must be hoisted and held by manpower into the proper position until the mounting device and nut are properly joined to maintain the spare in its proper suspended position.

There is a need to provide a mounted exposed spare which is not as subjected to the dirt, road grit, etc., as previously known, which is not as subjected to theft as previously known, and which is convenient to remove and replace.

SUMMARY OF THE INVENTION

Accordingly, the present invention provides a device which permits exposed spares to be mounted inside the bed of a pick-up truck in a manner so as not to be as subjected to dirt, grit, etc., as previously known, so as not to be as subjected to theft, as previously known, and which is convenient to remove and replace.

The foregoing is accomplished by providing an apparatus for use in the bed portion of a pick-up truck including a baseplate secured to one of the vertical sidewalls of the truck bed. A first member has a first end removably secured to the baseplate and extends therefrom. A second member is fixedly secured to the first member and extends substantially parallel with the first member. The first member is of a construction sufficient for extending through a hub hole of an associated spare wheel. The second member is of a construction sufficient for extending through a lug hole of the spare. Means are provided for retaining the spare on the second end of the first member.

As a result, a spare can be mounted to abut the sidewall to that the first member protrudes through the hub hole and the second member protrudes through a lug hole of the spare. The retaining means can then be placed on the first member in engagement with the rim of the hub hole and can be urged into abutting engagement with the spare to urge the spare firmly against the sidewall.

The foregoing and other advantages and novel features will become apparent from the following detailed description of the invention when considered in conjunction with the accompanying drawings. It is to be expressly understood, however, that the drawings are not intended as a definition of the invention but are for the purpose of illustration only.

BRIEF DESCRIPTION OF THE DRAWINGS

In the drawings wherein like parts are marked alike:

FIG. 1 is an isometric view illustrating a portion of a pick-up truck in combination with a spare wheel and tire secured by the securing device of this invention;

FIG. 1A is a side elevation illustrating a padlock secured on an associated member and having a shackle guard connected for protecting the shackle of the padlock;

FIG. 1B is an isometric view illustrating a known shackle guard used in combination with the securing device of this invention;

FIG. 2 is an isometric view illustrating the securing device of this invention;

FIG. 2A is a partial cross-sectional side elevation illustrating another embodiment of the securing device of this invention; and FIG. 3 is a cross-sectional side elevation illustrating the securing device of this invention securing a spare wheel and tire to a sidewall of the bed portion of a pick-up truck.

DESCRIPTION OF THE PREFERRED EMBODIMENT

Referring now to the drawings, FIG. 1 generally illustrates a pick-up truck designated 10 including a bed portion designated 12, a cab 13 and vertical sidewalls 14, 16, 18. Spare tire 20 is secured adjacent sidewall 16 by securing device generally designated 22.

Generally, securing device 22 is illustrated in FIG. 2 and includes baseplate 24. A first elongated means such as extension member 26 is removably mounted on baseplate 24. A second elongated means such as anti-rotating member 28 is fixedly secured to extension member 26 and includes first portion 28 $a$ and second portion 28 $b$. Means such as spanner member 30 is for retaining a spare on extension member 26. Means such as wing nut 32 is threadedly mounted on the extension member adjacent spanner 30 for urging spanner along member 26. Bore 34 in extension member 26 (see also FIG. 1A) accommodates shackle portion 36 of padlock 38. A shackle guard 40 engages and protects shackle portion 36.

Shackle guard 40, FIGS. 1A and 1B, such as is fully described in my U.S. Pat. No. 4,122,693 issued Oct. 31, 1978, comprises a housing 40a having a shackle securing member 40b therein. A first opening 40c permits a member, such as member 26, to extend into housing 40a. A second opening 40d permits shackle 36 to be moved into and out of housing 40a. In this manner, shackle 36 can engage securing member 40b and extension member 26 within housing 40a. This limits tampering with shackle 36 when engaged with extension member 26 within housing 40a.

In FIGS. 2 and 3, baseplate 24 is mounted on sidewall 16. Extension member 26 extends from baseplate 24 through hub hole 42 of spare wheel and tire 20. First portion 28a of anti-rotating member 28 extends through lug hole 46 of spare 20. Spanner 30 and wing nut 32, adjacent hub hole 42, urge spare 20 into abutting engagement with sidewall 16. Padlock 38 limits removal of nut 32 from member 26. Shackle guard 40 limits tampering with shackle portion 36. Anti-rotating member 28 limits rotation of extension member 26 so as to remove same from baseplate 24.

BASEPLATE

More specifically now, in FIGS. 2, 2A and 3, baseplate 24 is preferably rectangularly shaped but the shape may be varied as desired as can the physical dimensions. However, baseplate 24 is preferably formed of an elongated aluminum plate having a thickness of about 5/16 inches and a width of about 2 inches. Of course, the material and dimensions may vary within the scope of this invention.

Baseplate 24, FIGS. 2 and 3, includes a threaded receptacle 52 for receiving extension member 26. Baseplate 24 is mounted on sidewall 16 due to pin 53 fixed to plate 24 and resting on surface 16a of sidewall 16. Openings 16b in sidewall 16 permits member 26 to extend through the typically double sidewall for threaded engagement with baseplate 24. By virtue of pin 53 and extension member 26 engaging the baseplate 24 and sidewall 16, the baseplate is retained from movement relative to sidewall 16. Baseplate 24 including pin 53 is primarily for use on sidewall 16 between bed 12 and cab 13 and is not contemplated for use on either of the sidewalls 14 or 18.

Another embodiment for the baseplate is shown in FIG. 2A. A baseplate 24a is contemplated primarily for use on either sidewall 14 or 18 and may also be used on sidewall 16. For example, baseplate 24a is inserted between the typical double wall portions of sidewall 18. Three apertures 65, 67 and 69 are provided in sidewall 18. Baseplate 24a is secured to sidewall 18 by bolts 55 which extend through apertures 65 and 67 in sidewall 18 and into threaded top and bottom receptacles 61,63 respectively, in baseplate 24a. Lockwashers 57 may be used if desired to enhance the security of bolts 55 in sidewall 18. Member 26 extends through aperture 69 in sidewall 18 and is received in threaded receptacle 52a in baseplate 24a. By virtue of bolts 55 engaging baseplate 24a and sidewall 18, the baseplate is retained from movement relative to sidewall 18.

EXTENSION MEMBER

Extension member 26 is preferably of case-hardened steel but may be of another suitable member if preferred. Member 26 is preferably a ⅜ inch diameter threaded rod including a first end 54 threaded for mating engagement with threaded receptacle 52 of baseplate 24. Member 26 extends along its longitudinal axis from baseplate 24 and terminates at threaded second end 56 including bore 54 formed therethrough transverse to the longitudinal axis thereof.

ANTI-ROTATING MEMBER

Anti-rotating member 28 is preferably of ½ inch diameter case-hardened steel and includes first portion 28a extending substantially parallel with extension member 26 and terminating at a distance from baseplate 24 approximately equal with the end 56 of extension member 26. Member 28 also includes a second portion 28b fixedly attached to extension member 26 for spatially interconnecting the extension member and first portion 28a. Member 28 is thus preferably "L" shaped as illustrated or may be of any suitable configuration.

Wing nut 32 is generally a well known or standard type item. Nut 32 is threaded to accommodate threaded second end 56 of extension member 26. Padlock 38 is a generally well-known item and includes shackle 36 of a diameter to be suitable to pass through bore 34 in second end 56. Spanner member 30 includes a bore 31 for accommodating extension member 26. Spanner member 30 is preferably of steel and is of a construction sufficient for engaging rim 33 of hub hole 42. As shown, spanner 30 is elongated so as to be longer than the diameter of hub hole 42. Spanner member 30 functions as a means for retaining spare 20 on second end 56 of member 26. Wing nut 26 functions as a means for urging spanner 30 into abutting engagement with rim 33 of spare 20.

OPERATION

With baseplate 24 mounted on sidewall 16, extension member 26 can be threadedly engaged therewith at first end 54. Spare 20 can then be placed in abutment with sidewall 16 and floor 50 so as to permit extension member second end 56 to protrude through and beyond hub hole 42 and so as to permit first portion 28a of anti-rotating member 28 to protrude through and beyond lug hole 46 as illustrated. Spanner 30 can then be mounted on extension member second end 56 in abutment with rim 33 of hub hole 42. Nut 32 can then be threaded on second end 56 for urging spanner 30 into abutment with rim 33 and for urging spare 20 into abutment with sidewall 16. Shackle 36 of padlock 38 can be inserted through bore 34. Shackle 36 can then be inserted into housing 40a and engaged with member 40b. The shackle can then be urged into locking engagement with padlock 38. The relationship of the longitudinal axis of rotatable extension member 26 and floor 50 should be such that rotation of spare 20 about that axis of member 26 will be limited due to spare 20 engaging floor 50. This relationship is satisfied where the distance from the floor 50 to the axis of member 26 is less than the radius of spare wheel 20.

For removal of spare 20, the padlock, shackle guard, spanner and nut can be easily removed and spare 20 dismounted from extension member 26 and anti-rotating member 28. If desired, extension member 26 can be removed from baseplate 24.

The foregoing describes a novel device for securing exposed spare tires which permits the spare to be mounted inside the bed of a pick-up truck in a manner so as not to be as subject to dirt, grit, etc., as previously known, so as not to be as subjected to theft as previously know, and which is convenient to remove and replace.

Many modifications and variations of the present invention are possible in the light of the above teachings. It is therefore to be understood that within the scope of the appended claims the invention may be practiced otherwise than as specifically described.

What is claimed is:

1. Apparatus for securing a spare wheel engaged with a floor and a sidewall of a truck bed comprising:

a baseplate, said baseplate being removably mounted on the sidewall;

means for retaining the baseplate on one side of the sidewall, said means including first and second members attached to the baseplate, said first member extending from said baseplate for engagement with a top edge of the sidewall, said second member having a first end threaded into the baseplate on one side of the sidewall and extending therefrom through an opening in said sidewall and terminating at a second end on the other side of the sidewall for extending through a hub hole of an associated spare wheel, said opening being at a distance from the floor less than the radius of the spare wheel;

anti-rotating means fixedly secured to the second member including a portion extending substantially parallel with the second member and through a lug hole for anti-rotating engagement with the lug hole upon rotation of the second member;

means for retaining the spare on the second end of the second member, said means being a spanner member mounted on the second end being of a construction sufficient for engaging a rim of the hub hole; and means for urging the spanner into abutting engagement with the spare, said means being a member threaded on the second end wherein the apparatus is easily removed from the sidewall of the trunk bed when not in use because there are no fasteners attaching the apparatus to the truck.

2. Apparatus of claim 1 wherein the second end of the second member has a bore transverse to the longitudinal axis, said bore being between the second end and the means for retaining the spare.

3. Apparatus of claim 2 including a padlock having a shackle passing through the bore.

4. Apparatus of claim 3 including a shackle guard engaged with the shackle and with the second end.

* * * * *